Patented May 4, 1937

2,078,950

UNITED STATES PATENT OFFICE 2,078,950

OPERATION OF CATALYTIC CONVERTERS

Eugene J. Houdry, Philadelphia, Pa., and Thomas B. Prickett, Woodbury, N. J., assignors to Houdry Process Corporation, Dover, Del., a corporation of Delaware Application June 4, 1935, Serial No. 24,844

7 Claims. (Cl. 196—52)

This invention relates to temperature control of reaction vessels. It is more particularly concerned with controlling the temperature of portions of a reaction chamber or zone containing a contact mass which may promote, enter into, or in any way assist chemical transformations. The invention is especially directed toward converters having operative cycles comprising alternate periods of exothermic and endothermic reactions.

One object of the invention is to hold a wall of the reaction chamber at substantially constant temperature during both periods of the operative cycle. Another object is to prevent large internal stresses in the wall and other portions of the converter and warpage or deformation caused by such stresses. Still another object is to maintain those portions of the contact mass adjacent the chamber wall at reaction temperature during the exothermic phase of the operative cycle. Still further objects will be apparent from the detailed discussion which follows.

In one form of converter to which the invention is directed the fluid reactants for each period of the operation cycle are admitted to a manifolding chamber or zone in contiguity with the reaction chamber or zone and separated from the latter by a perforated partition extending across the converter. The reactants then pass through the partition and into the mass. If desired, they may be distributed throughout the depth and cross section of the mass by any suitable means, including perforated conduits such as those disclosed and claimed in the U. S. Patent No. 1,987,904 issued January 15, 1935 to Eugene J. Houdry.

The temperatures of those portions of the converter shell bounding the manifolding chamber and of the face of the perforated partition toward that chamber closely follow the temperatures of fluids contacting them. The temperature of the contact mass is controlled to some extent by the temperature of entering reactants, but tends to go up or down with exothermic or endothermic reactions, the amount of temperature variation depending on the intensity of these reactions and the rate at which heat can be supplied to or removed from the mass. Those portions of the converter forming the reaction chamber vary in temperature with the contact mass. In instances where the reactions effected in the presence of the contact mass are strongly endothermic or exothermic in character, the temperature of the mass may be controlled by supplying heat thereto or removing heat therefrom as by circulating one or more streams of fluid in heat exchange relation with the mass as indicated for example in the copending application of Eugene J. Houdry and Raymond C. Lassiat, Serial Number 728,544, filed June 1, 1934.

The walls of the manifolding chamber in a converter operating in an endothermic transformation at elevated temperature assume approximately the temperature of the entering reactants. When lower temperature fluid reactants for a subsequent exothermic reaction at the same or a higher temperature are admitted to the manifolding chamber the wall temperatures of the latter drop sharply toward the temperature of these fluids while the temperature of the mass adjacent the manifolding chamber drops slowly or even rises. Thus, portions of the converter common to the manifolding and reaction chambers, as for example, the perforated partition and the converter walls, are subjected to internal stresses, caused by unequal rates of contraction within themselves or even opposed contraction and expansion. In some instances, these stresses become high enough to cause deformation or warpage of these portions of the converter. It is evident that when the transition is from exothermic to endothermic reactions unequal and non-compensating rates of expansion and contraction also tend to produce warpage of the converter structure. Stiffening or supporting members are sometimes provided for the perforated partition, particularly when the latter supports the weight of the contact mass and/or a series of fluid distributing members. In such instances, the tendencies of the partition to deform with changes in temperature of fluids entering the converter are intensified. The supporting members themselves are subject to deformation and/or pulling loose from their supporting fastenings with these temperature changes. One method of obviating the above difficulties is by directly heating certain portions of the converter, as for example, after the manner disclosed in the copending application of Thomas B. Prickett, filed February 10, 1934 and bearing Serial No. 710,612.

The present invention contemplates correcting the undesirable temperature conditions by control of the temperature of the reactants and involves feeding fluid reactants for each period of the operation cycle to the converter at or near the same temperature. The reactants for the endothermic reaction are heated to reaction temperature or slightly above and admitted to the manifolding chamber and thence to the contact mass and for the subsequent exothermic reaction the reactants are heated to the extent necessary to maintain the walls of the manifolding chamber at a substantially constant temperature, thus avoiding rapid and extensive changes in temperature of these portions of the converter structure with respect to the remainder. In addition to the above function, the heated reactants for the exothermic reaction period maintain the mass adjacent the perforated partition at a temperature level more nearly coincident with that of the main body of the mass.

One application of the invention is in the utilization of a contact mass alternately in transformation or treatment of hydrocarbons at one temperature level, say 750 to 900° F. and in regeneration at a higher temperature, as at 900 to 1100° F. The hydrocarbons are usually heated to slightly above reaction temperature, as to 770 to 925° F., and fed to the converter during a transformation period. In the subsequent regeneration, the regenerating medium, as for example, a stream of oxygen bearing fluid, such as air or a mixture of air and inert gaseous diluents, is heated in any desirable manner to bring it within or near the temperature of the stream of hydrocarbons, as to 750 to 850° F. The inlet temperature of the regenerating medium is determined by the desired temperature for the walls of the manifolding chamber, especially the perforated partition. Following a hydrocarbon transformation effected at substantially 825° F. and during a regeneration at about 1050° F., an inlet temperature of the regenerating medium of approximately 800° F. holds the partition at substantially 825° F. Any lowering of the temperature of the partition tends to check or retard the rate of regeneration of the mass which is adjacent the partition.

Concrete embodiments of the invention are disclosed in the accompanying drawings, in which.

Figure 1:
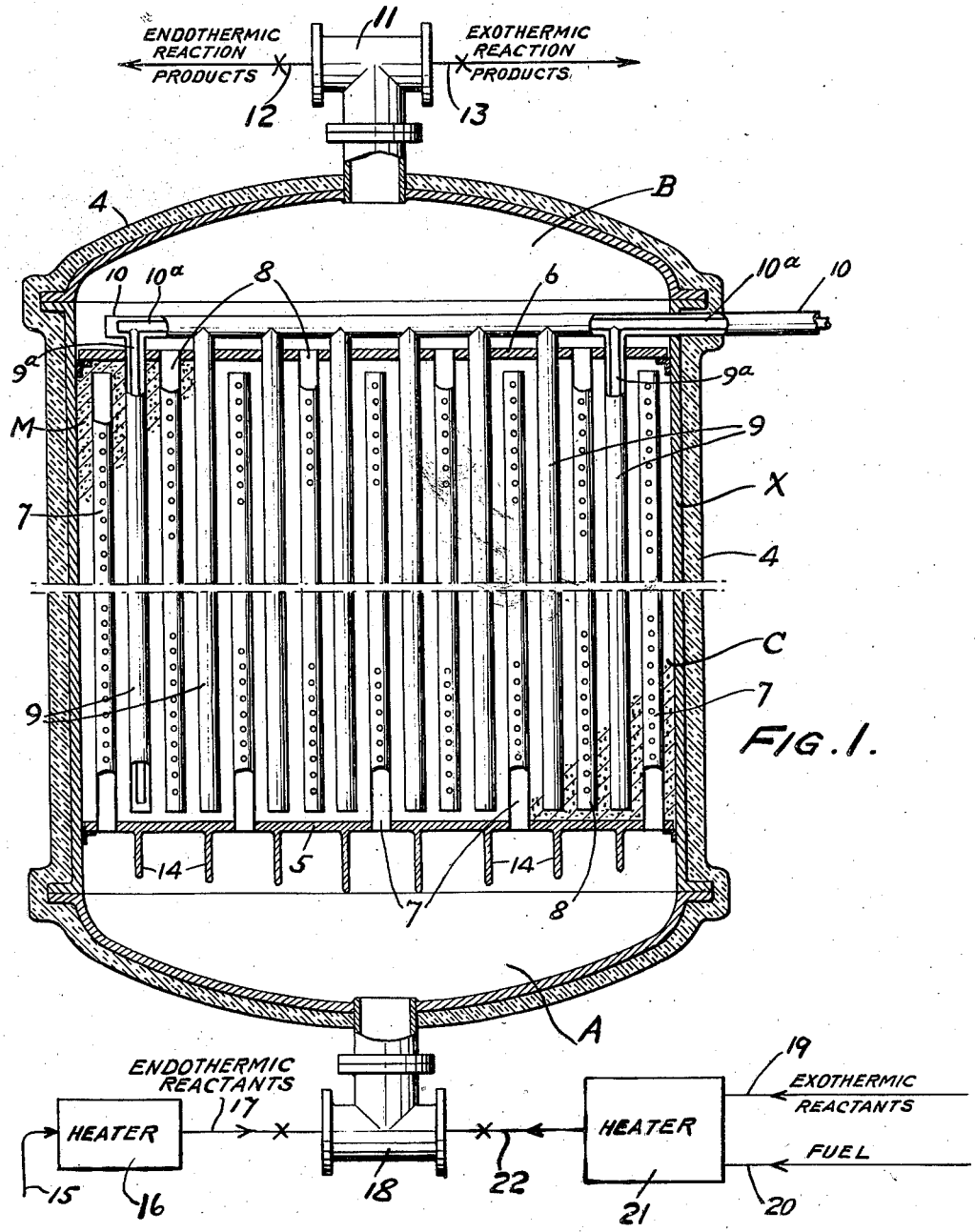
Fig. 1 is an illustration of one form of the invention showing a preferred form of the converter in section.

In Fig. 1 converter X preferably covered with suitable heat insulating material such as lagging 4 is divided into end manifolding chambers A and B and centrally located reaction chamber C by perforated partitions or flue sheets 5 and 6. Fluid reactants for either exothermic or endothermic reactions supplied selectively by valved lines 17 or 22 pass through T 18 to enter manifolding chamber A and are distributed uniformly throughout the depth and cross section of contact mass M disposed in reaction chamber C by a series of nested distributing members or perforated conduits 7 while fluid reaction products are simultaneously vented from a plurality of points in mass M into a series of perforated outlet conduits 8, substantially as described in the copending U. S. application of Eugene J. Houdry, Serial No. 611,362, filed May 14, 1932 which issued on June 2, 1936 as Patent No. 2,042,468. Mass M may be of any known or desired type capable of effecting the desired transformation or treatment of the starting material but is preferably in the form of bits, fragments, or molded pieces for regeneration in place and when utilized in the transformation of hydrocarbons may conform to those disclosed in the copending applications of Eugene J. Houdry, Serial No. 600,581 filed March 23, 1932 and Serial No. 35,101, filed August 7, 1935. The fluid reaction products are discharged into manifolding chamber B and thence into T 11 to enter valved line 12 or valved line 13. Nested conduits 9 and 9a embedded in mass M serve to conduct a plurality of streams of cooling or heating fluids by reversed flow in heat exchange relation with mass M to remove heat from the latter during the exothermic reaction period and/or to supply heat to mass M during the endothermic reaction period. Manifolds 10 and 10a in nested relation supply the heat exchange fluid to and remove this fluid from conduits 9 and 9a. A continually fresh supply of heating or cooling fluid may be used, or the fluid may be recirculated through conduits 9 and 9a and a suitable cooling system, as for example, the circuits described in the aforesaid copending U. S. application of Eugene J. Houdry and Raymond C. Lassiat.

Partition 5 is provided with ribs or stiffening members 14 to assist it in supporting the weight of contact mass M and conduits 7. Members 14 of contact mass M and conduits 7. Members 14 may be an integral part of partition 5, substantially as shown or they may be individual members attached, if desired, to partition 5 in any suitable manner and supported from the latter or the walls of converter 4 or both. Whether attached to partition 5 or not or supported from the latter and/or the walls of manifolding chamber A it is important that members 14 be maintained at substantially the temperature of partition 5 to prevent deformation of these members and/or loosening of their supporting fastenings.

Reactants for the endothermic transformation are conducted by line 15 from a suitable source of supply to heater 16 of any suitable type, wherein they are heated to the desired reaction temperature or slightly above, as to 750 to 925° F., in instances where the charge comprises certain types of hydrocarbon materials, as for example, light and heavy oils or vapors. The heated reactants are then conducted through valved line 17 and inlet T 18 into manifolding chamber A, whence they are admitted to reaction chamber C, as described above. The reaction products are vented from the converter through outlet T 11 and into valved line 12 leading to equipment for recirculation, storage, heating, cooling, fractionation, or any other desired treatment.

Reactants for the exothermic reaction are fed into a heater 21 by line 19 where they are heated to substantially the temperature of the endothermic reactants by direct or indirect heat exchange with combustion products from a suitable fuel conducted to heater 21 by line 20. The exothermic reaction products are vented from the converter through outlet T 11 and line 13. Regenerating medium, such as air, is efficiently and economically raised to the desired temperature, to 800° F., for example, in direct heat exchange with combustion products from a fuel, as by commingling with and supporting combustion of a controlled amount of the latter. The direct heat exchange heater avoids the difficulties and expense of the erection, operation and maintenance of certain indirect heat exchange furnaces, such as pipe stills or the like, which often must be constructed of expensive alloy steels, particularly when they are intended to handle air and corrosive fluids at high temperatures.

Figure 2:
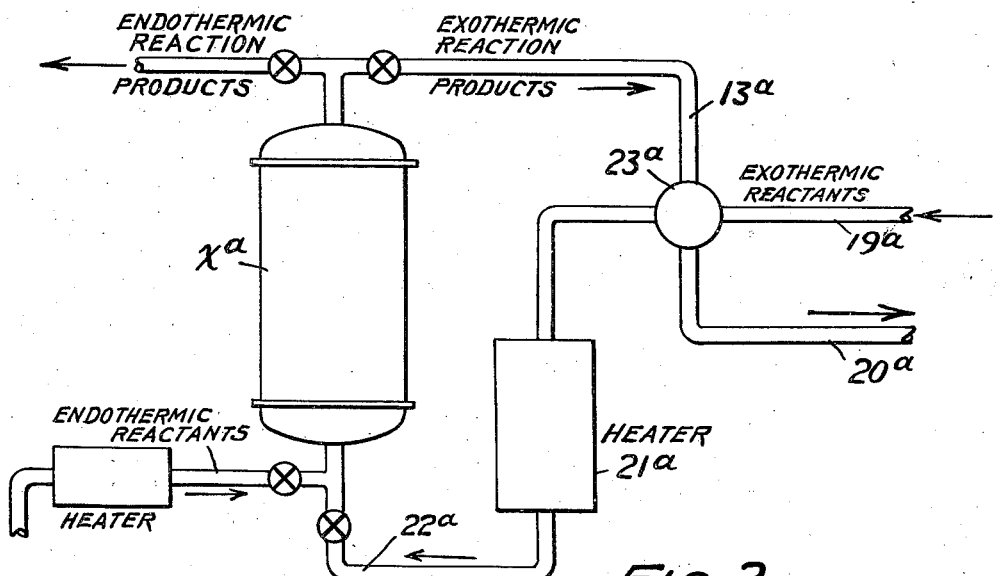
Fig. 2 is a diagrammatic representation of a modified form of the invention.

Whereas, in the embodiment disclosed in Fig. 1, the exothermic reactants are heated to the desired temperature in a single stage, Fig. 2 illustrates two stage heating of these reactants. Exothermic reaction products leaving converter Xa by valved line 13a enter heat exchanger 23a wherein they impart heat to the exothermic reactants being supplied by line 19a. The heated reactants are further heated to the predetermined temperature level in heater 21a of any desirable type and are conducted thence into converter Xa by valved line 22a. The temperature of the regenerating fluid may be raised to the range of 300 to 600° F. in exchanger 23a and to the range of 750 to 850° F. in the second stage heater 21a.

Figure 3:
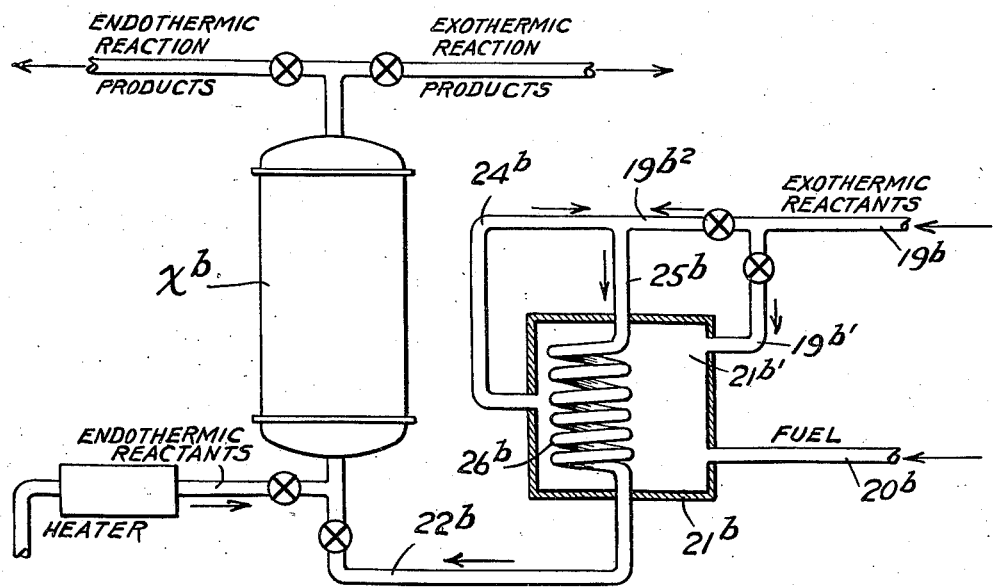
Fig. 3 is a diagram representing a still different modification.

In Fig. 3, the exothermic reactant fluids, such as air or the like are supplied by line 19b. The fluid is split into two streams which flow through valved conduits 19b' and 19b², respectively, the proportionate amounts of these two streams being controlled by the valves in conduits 19b' and 19b². One stream is conducted into combustion chamber 21b' of heater 21b where it commingles with fuel supplied by line 20b and is heated to a predetermined temperature in direct heat exchange relation with the burning fuel. The stream of combustion products passes through line 24b to be commingled with the air stream in line 19b². The combined streams then pass through conduit 25b into pipe coil 26b where they are in indirect heat exchange relationship with the combustion mixture in chamber 21b' to complete heating of the regenerating medium to the desired temperature before admittance to the converter through conduit 22b.

Converters Xa and Xb in Figs. 2 and 3, respectively, may be like converter X and may have similar internal and heat exchange structure; or converters Xa and Xb may constitute some variation or modification of the converter structure shown in Fig. 1 or they may be of any different construction which is adapted for use in carrying out the process described herein.

With control of the proportionate amounts of regenerating medium heated by indirect heat exchange alone and by both direct and indirect heat exchange, this fluid can be simultaneously heated to the desired temperature, such as 750° to 850° F. and commingled with a predetermined and controlled amount of diluting combustion fumes.

It is apparent from the above that the invention presents improvements in the operation of converters which simplify problems met in the design and use of the same. The invention is not limited in its essence to the specific forms and examples disclosed herein for the purpose of illustration and explanation. The converter may be of any type adapted for processing fluids which enter alternately into endothermic and exothermic chemical reactions. The invention is applicable whether the converter is operated in horizontal, oblique, upright, or inverted position.

We claim as our invention:

1. In the temperature control and operation of a converter for transforming fluid reactants providing a reaction zone containing a catalytic mass and a fluid manifolding zone adjacent thereto and separated therefrom by a metal partition member but communicating therewith, said mass being adapted to be employed alternately on-stream to effect the desired transformation of reactants and in regeneration in place to eliminate combustible deposits or contaminants which accumulate thereon during the on-stream or reaction period, the process steps which comprise during the on-stream and regeneration reaction periods of the cycle of operation passing the fluid reactants into and through said manifolding zone in contact with said partition member and then into said reaction zone, the reactants being supplied at such respective temperatures during each of the periods of the cycle of operation as will maintain said partition at approximately constant temperature throughout the whole cycle of operation, and maintaining the reaction zone at the temperatures desired therein primarily by removing or adding heat with an independent heat exchange medium circulated within said reaction zone but out of contact with the mass contained therein.

2. In the temperature control and operation of a converter providing a reaction zone and manifolding zone adjacent to and separated from said reaction zone but communicating therewith, said reaction zone containing a catalytic mass adapted for use in alternate endothermic and exothermic periods of reaction for transforming hydrocarbons and regenerating said mass in place to eliminate therefrom combustible deposits or contaminants which accumulate thereon during the transforming reaction period, the process steps which comprise, during the endothermic reaction period passing fluid hydrocarbon reactants, heated to approximately the reaction temperature desired within the reaction zone, into and through said reaction chamber so that the hydrocarbons contact the portions of the converter separating said reaction and manifolding zones in passing through said converter; during the exothermic reaction period passing the regenerating medium, heated to approximately the temperature of the reaction zone during the said endothermic period, into and through said manifolding zone and into said reaction zone, and maintaining the reaction zone at the desired temperatures during each of said reaction periods by removing or adding heat by an independent heat exchange medium circulated within said reaction zone but out of contact with the mass contained therein, so that during each period of the cycle of operation the manifolding zone is maintained at a temperature approximating that of the said reaction zone and the portions of the converter separating said manifolding zone from said reaction zone are at all times during the cycle of operation maintained within a sufficiently restricted temperature range to avoid deleterious stresses or distortions due to temperature changes.

3. In the temperature control and operation of a converter providing a reaction zone and an inlet manifolding zone adjacent to and separated from said reaction zone but communicating therewith, said reaction zone containing a catalytic mass adapted for use in alternate endothermic and exothermic periods of reaction for transforming hydrocarbons and regenerating said mass in place to eliminate therefrom combustible deposits or contaminants which accumulate thereon during the transforming reaction period, the process steps which comprise during the endothermic and exothermic reactions heating the reactants to approximately the respective temperatures desired within said reaction zone, passing said heated reactants into and through said manifolding zone and into said reaction zone, and maintaining the reaction zone at the desired temperatures during each of said reaction periods by removing or adding heat by an independent heat exchange medium circulated within said reaction zone but out of contact with the mass contained therein, so that during each period of the cycle of operation the manifolding zone is maintained at a temperature approximating that of the said reaction zone and the portions of the converter separating said manifolding zone from said reaction zone are at all times during the cycle of operation maintained within a sufficiently restricted temperature range to avoid deleterious stresses or distortions due to temperature changes.

4. In the temperature control and operation of a converter providing a reaction zone and an inlet manifolding zone adjacent to said reaction zone and separated therefrom by a partition member but communicating with said reaction zone, said reaction zone containing a catalytic mass adapted for use in a cycle of operation involving alternate periods on-stream to effect the desired transformation of hydrocarbons and in regeneration in place to remove combustible deposits or contaminants therefrom, said regeneration having a strong exothermic heat of reaction and said on-stream transformation having only a relatively small heat of reaction, the process of treating, while maintaining said partition member within a sufficiently narrow temperature range so as to avoid distortion thereof due to temperature changes, which comprises heating hydrocarbon reactants to such a temperature, approximating that desired within said reaction zone during the on-stream period, as will hold said partition member at approximately the means of the temperatures desired within said reaction zone during the whole cycle of operation, feeding said reactants through said manifolding zone in contact with said partition member and into said reaction zone for a period of transformation, during which combustible deposits or contaminants accumulate on the mass contained in said reaction zone, then in a subsequent regeneration period passing a regenerating medium through said manifolding zone in contact with said partition member and into said reaction zone at such different temperature as will also hold said partition member at approximately the said mean of the temperatures desired within said reaction zone during the whole cycle of operation, and maintaining said reaction zone at desired temperature during the regeneration period by removing heat with an independent heat exchange medium circulated within said reaction zone but out of contact with the mass contained therein.

5. In the operation of a converter providing a reaction zone and a fluid manifolding zone adjacent thereto and separated therefrom by a metal partition member but communicating therewith, said reaction zone containing a catalytic mass adapted in alternate periods of the cycle of operation to effect transformation of hydrocarbons and to be regenerated in place by an oxygen-containing fluid to remove combustible deposits or contaminants which become deposited thereon during the on-stream or reaction period, the process steps which comprise heating hydrocarbon reactants to a temperature substantially within the range of 750 to 925° F., feeding the heated hydrocarbons through said manifolding zone in direct contact with said partition member and then through the latter into said mass during the on-stream or transformation period, in the subsequent regenerating period feeding an oxygen-containing regenerating medium through said manifolding zone into said mass, at such a temperature within the aforesaid temperature range as to minimize or avoid stresses in said partition member, and circulating a heat exchange fluid in heat exchange relation with the mass but out of contact with the latter during the cycle of operation, at such temperatures as to maintain said mass at the desired operating temperatures.

6. In the temperature control and operation of a converter providing a reaction zone and an inlet manifolding zone adjacent to and separated from said reaction zone, but communicating therewith, said reaction zone containing a catalytic mass adapted for use in alternate periods having different heats of reaction for transforming hydrocarbons and regenerating said mass in place to eliminate therefrom combustible deposits or contaminants which accumulate thereon during the on-stream or reaction period, the process of maintaining the portions of said converter common to both said reaction zone and said manifolding zone at substantially constant temperature during both periods of the cycle of operation of the converter comprising the steps of heating the hydrocarbon reactants to a temperature within the range of 770° to 925° F., feeding the heated reactants through said manifolding zone and into said reaction zone containing said catalytic mass for a period of transformation of said reactants, in the subsequent regeneration period heating a fluid regenerating medium to a temperature within the range of 750° to 850° F. and feeding the latter through said manifolding zone and into said reaction zone to remove deposits from the said mass contained therein, and during the cycle of operation maintaining the catalytic mass at the temperatures desired therein by removing or adding heat with an independent heat exchange medium circulated within said reaction zone but out of contact with the mass contained therein.

7. In the temperature control and operation of a converter providing a reaction zone and an inlet manifolding zone adjacent to and separated from said reaction zone, but communicating therewith, said reaction zone containing a catalytic mass adapted for use in alternate periods having different heats of reaction for transforming hydrocarbons and regenerating said mass in place to eliminate therefrom combustible deposits or contaminants which accumulate thereon during the on-stream or reaction period, the process of maintaining the portions of said converter common to both said reaction zone and said manifolding zone at substantially constant temperature during both periods of the cycle of operation of the converter comprising the steps of heating the hydrocarbon reactants to a temperature within the range of 770° to 925° F., feeding the heated reactants through said manifolding zone and into said reaction zone containing said catalytic mass for a period of transformation of said reactants, in the subsequent regeneration period heating an oxygen-containing regenerating medium to a temperature of approximately 800° F. and feeding the latter through said manifolding zone and into said reaction zone to remove deposits from the said mass contained therein, and during the cycle of operation maintaining the catalytic mass at the temperatures desired therein by removing or adding heat with an independent heat exchange medium circulated within said reaction zone but out of contact with the mass contained therein.

EUGENE J. HOUDRY.
THOMAS B. PRICKETT.

CERTIFICATE OF CORRECTION.

Patent No. 2,078,950.   May 4, 1937.

EUGENE J. HOUDRY, ET AL.

It is hereby certified that error appears in the printed specification of the above numbered patent requiring correction as follows: Page 4, first column, line 23, claim 4, for "means" read mean; and that the said Letters Patent should be read with this correction therein that the same may conform to the record of the case in the Patent Office.

Signed and sealed this 29th day of June, A. D. 1937.

Henry Van Arsdale (Seal)   Acting Commissioner of Patents.